(No Model.)

A. CUNNINGHAM.
MOLD FOR CASTING SOLDER JOINTS.

No. 337,562. Patented Mar. 9, 1886.

WITNESSES:

INVENTOR:
A. Cunningham
BY Munn & Co.
ATTORNEYS.

UNITED STATES PATENT OFFICE.

ARTHUR CUNNINGHAM, OF LOUISVILLE, KENTUCKY.

MOLD FOR CASTING SOLDER-JOINTS.

SPECIFICATION forming part of Letters Patent No. 337,562, dated March 9, 1886.

Application filed December 14, 1885. Serial No. 185,616. (No model.)

*To all whom it may concern:*

Be it known that I, ARTHUR CUNNINGHAM, of Louisville, in the county of Jefferson and State of Kentucky, have invented a new and useful Improvement in Molds for Casting Solder-Joints, of which the following is a specification, reference being had to the annexed drawings, forming a part thereof, in which—

Figure 1:
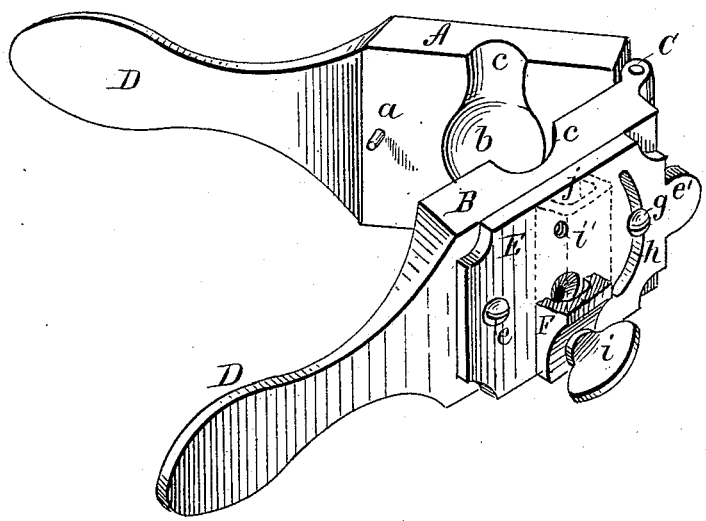
Figure 2:
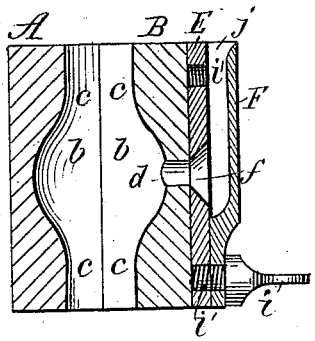

Figure 1 is a perspective view, with a part broken away to show the internal construction. Fig. 2 is a transverse section taken through the center of the mold.

Similar letters of reference indicate corresponding parts in the different figures of the drawings.

The object of my invention is to provide a mold by means of which a joint may be readily formed upon a horizontal or a vertical pipe by the process of casting, the mold being arranged to encircle the pipe and to contain sufficient melted solder to form a joint of the required size and shape.

The halves A B of the mold are connected together by a hinge, C, and are provided with handles D, by means of which they may be held in contact with each other.

The part A of the mold is provided with a dowel, *a*, which enters a corresponding hole in the part B and causes the two halves of the mold to register as they are closed together around the pipe.

Each half of the mold has a cavity, *b*, terminating above and below in the semi-cylindrical grooves *c*, the groove *c*, when the mold is closed together around the pipe, coming into close contact with the outer walls of the pipe, leaving an annular chamber around the joint of the pipe formed by the two cavities *b*. The cavities *b* are made of the form of the required joint.

The part B of the mold is provided with an aperture, *d*, at the center of the cavity *b*, and upon the outer face of the part B of the mold is pivoted a steel plate, E, upon the screw *e*, the plate having a central aperture, *f*, which is countersunk to produce cutting-edges around the aperture. The free end of the plate E is provided with a lug, *e'*, which projects beyond the end of the mold, and the plate is clamped to the side of the mold by a set-screw, *g*, passing through a curved slot, *h*, and entering the side of the mold.

To the face of the plate E is secured a block, F, by the thumb-screw *i*, which passes through the end of the block and into one or the other of the threaded holes *i'* in the plate E. In the inner face of the block F is formed a channel, *j*, which communicates with the countersunk hole *f* in the center of the plate E.

The joint between the ends of the pipe is protected by means of putty or other suitable material, to prevent the leakage of solder to the interior of the pipe, and the mold is closed around the pipe with the joint of the pipe in the center of the mold. If the pipe is horizontal, the block F is turned to one side, and the plate E being adjusted so that the aperture *f* corresponds with the aperture *d* of the mold, the solder is poured through the plate and through the aperture *d* into the mold and around the pipe, thus forming a joint of the shape of the interior of the mold. By turning the plate E on its pivot and striking the lug *e'* with a hammer, the sprue is cut away, when the mold may be opened, and the remaining portion of the sprue left upon the joint may be removed by means of a file.

When it is desired to form a joint upon a vertical pipe, the channeled block F is arranged so that its channel communicates with the apertures *f d*, when the metal will be poured into the open end of the channel *j*, and will pass through the apertures *f d* into the mold, as before. In this case, after cutting off the sprue, it will be necessary to remove the channeled block F from the plate E before the sprue can be taken from the countersunk hole *f*.

The screw *i* may be shifted from one to the other of the holes *i'* in the plate F, to permit of using the mold either side up.

Should the mold fail to contact with the sides of the pipe to which it is applied, putty or clay may be applied to the joint between the mold and the pipe.

My improved mold produces uniform work. It enables inexperienced workmen to make a perfect joint on a vertical pipe, and effects considerable saving in the expense of plumbing.

Having thus described my invention, what

I claim as new, and desire to secure by Letters Patent, is—

1. The combination, with the parts A B of a mold for forming solder-joints, of the plate E, provided with cutting-edges, and the channeled block F, substantially as herein shown and described.

2. As an improved article of manufacture, a mold for forming solder-joints, formed of the parts A B, hinged together and provided with cavities $b$, the plate E, pivoted to one-half of the mold, provided with a curved slot, $h$, lug $e'$, and clamped to the side of the mold by a set-screw, $g$, and the channeled block F and thumb-screw $i$, substantially as herein shown and described.

ARTHUR CUNNINGHAM.

Witnesses:
JAMES McGILL,
GEORGE W. CARICO.